TITRATION CURVE OF 200 ml SOLUTION WHOSE CONCENTRATION IS 0.5 M— AND 0.25 M—W ION, CONTAINING FREE AMMONIUM ION, WITH 4 N-HNO₃

PERCENTAGE OF PRECIPITATION OF W IONS FROM A SOLUTION OF AMMONIUM PARA-TUNGSTATE WITH HNO₃, VIZ. pH VALUE OF SOLUTION

-□-□- PRECIPITATED AT 25°C
-○-○- PRECIPITATED AT 50°C
-×-×- PRECIPITATED AT 70°C

CHANGE OF pH VALUE OF Co(NO$_3$)$_2$ SOLUTION AND PERCENTAGE OF PRECIPITATION OF Co ION, VIZ. QUANTITY OF NaOH ADDED (70°C)

TITRATION CURVE OF 0.833 M-Co(NO$_3$)$_2$, CONTAINING 0.666 N-HNO$_3$ WITH 0.4 N-NaOH

United States Patent Office 3,440,035
Patented Apr. 22, 1969

3,440,035
METHOD FOR PREPARING RAW MATERIALS
FOR SINTERED ALLOYS
Keizo Iwase, Toshio Takada, and Masao Kiyama, Kyoto-shi, Shigenobu Kasahara, Kawasaki-shi, Tamotsu Fukatsu and Soukichi Takatsu, Yokohama-shi, and Teiji Kusaka, Kyoto-shi, Japan, assignors to Toshiba Tungaloy Kabushiki Kaisha, Kawasaki-shi, Kanagawa-ken, Japan, a joint-stock company of Japan
Filed Aug. 30, 1965, Ser. No. 483,422
Int. Cl. B22f 9/00; C22c 1/06
U.S. Cl. 75—.5                    18 Claims

ABSTRACT OF THE DISCLOSURE

A method for economically preparing raw materials for sintered alloys of superior quality characterized in that a solution or a suspension of ammonium paratungstate and a nitric or hydrochloric aqueous solution of at least one metal selected from the iron group consisting of cobalt, nickel and iron are mixed. Said mixture is then subjected to a neutralizing reaction at a temperature of 20 to 80° C. and the pH value of the mother solution after reaction thereof is adjusted to 4.5 to 8.0. The resultant fine composite precipitate containing tungsten and at least one metal of the said iron group and having the desired composition to be controlled according to reaction condiions is filtered and dried by heating; and then subjected to reduction and carburization to obtain the composite powder.

This invention relates to a method for preparing raw materials for sintered alloys containing tungsten and a metal of the iron group (i.e., iron, cobalt and nickel) and more particularly to a novel method for preparing a composite powder consisting of tungsten and a metal of the iron group or tungsen carbide and a metal of the iron group which is utilized as the raw material for preparing a sintered alloy of tungsten carbide and a metal of the iron group or a sintered alloy of tungsten and a metal of the iron group.

A general object of the invention is to produce economically and with high efficiency raw material powders for preparing sintered alloys of superior quality.

Heretofore, sintered alloys essentially consisting of tungsten carbide WC and cobalt have been prepared by heating a mixture of metallic tungsten powder and carbon powder at an elevated temperature of more than 1400° C., for example, to form tungsten carbide WC, adding to this tungsten carbide WC cobalt powder and, if required, other additives such as TiC, TaC and the like, mechanically mixing together these ingredients, moulding the mixture under pressure and finally sintering the moulded compact at an elevated temperature of about 1450° C.

In this manner, tungsten powder was used as the starting material; since, however, tungsten powder has been ordinally prepared by a process including the steps of forming tungsten ore into complex salts of tungsten then turning it into oxides of tungsten and finally obtaining desired tungsten powder, several preliminary process steps were required.

In contrast, according to the novel process of the present invention, the process steps are greatly simplified by utilizing as the starting material a solution or a powder of a complex salt of tungsten which is formed at an intermediate step in the production of refined metallic tungsten and then directly forming a coprecipitate containing tungsten and a metal of the iron group by the chemical reaction in solution between tungsten ion in the starting material and a metallic ion of the iron group. When heating the coprecipitate to produce a carbide, the metal of the iron group acts as a catalyst so that carburization proceeds at a lower temperature of 1100° C., for example, which is far lower than the carburization temperature of tungsten alone. Moreover, as the particle size of tungsten carbide WC and the metal of the iron group in the composite powder is much finer, and its distribution is more uniform than those obtained by mechanical mixing, it is possible to readily produce sintered bodies of uniform and excellent quality.

We have invented a novel method of preparing composite powder of tungsten carbide WC and a metal or metals of the iron group which is suitable for use as the raw material for sintered alloys by mixing a solution containing ions of the iron group (actually, these ions are present in the solution as complexes containing ligands such as OH, $OH_2$ and the like, but for brevity these complexes are herein referred to as ions of the iron group) and a solution containing tungsten ions (actually, these ions are present in the solution as complexes containing ligands such as $NH_4$, $OH_2$, OH, etc., but for brevity, these complexes are herein referred to as tungsten ions) or by mixing a solution containing ions of a metal of the iron group and powder of a complex compound of basic tungsten thereby to prepare a coprecipitate containing tungsten and the metal or metals of the iron group, adding a suitable amount of carburizing agent to the coprecipitate, and then heating the mixture in a non-oxidizing atmosphere.

Accordingly, an object of this invention is to provide a novel method for preparing raw materials for sintered alloys containing tungsten carbide WC and a metal of the iron group or a composite powder of tungsten and a metal of the iron group wherein a composite precipitate containing tungsten and a metal of the iron group obtained from solution is carburized or reduced under heat.

Another object of this invention is to provide a novel method for preparing with high yield a composite precipitate by maintaining the pH value of a solution or a reaction solution containing tungsten and a metal of the iron group within a limited range, and consequently to provide a novel method for producing economically raw material for sintered alloys.

Still another object of this invention is to prepare a fine particle of raw material suitable for use as hard facing agent and also raw material for sintered alloy by selecting the temperature of carburizing said precipitates in a limited range.

A further object of this invention is to provide a novel method for preparing raw materials for sintered alloys wherein a suitable method is selected for carburizing said precipitate thereby facilitating adjustment of the quantity of carbon incorporated or mixing of carbon.

Yet another object of this invention is to provide raw materials for producing sintered alloys of superior quality by adding a certain kind of carbide into said composite powder of tungsten carbide WC and a metal of the iron group.

The novel features which characterize the present invention are set forth with particularity in the appended claims. The invention itself, however, together with further objects and advantages thereof may best be understood by reference to the following detailed description when it is read in connection with the accompanying drawings in which:

The invention will be described in detail with reference to the W-Co series. The solubility of tungsten ions is high in basic solutions but becomes very low in solutions of pH value of less than unity. Therefore, it is considered that it is impossible to recover tungsten ions with high yield unless the pH value of solutions containing tungsten ions is decreased. On the other hand, cobalt hydroxide does not precipitate at all from acidic solutions containing cobalt ions and having pH values of about unity. In view of these contradicting conditions of forming precipitates, commercial methods for preparing said coprecipitate of W-Co have not been sought out.

As a result of extensive research over several years, the present inventors have discovered a novel phenomenon regarding the relationship between pH value of the solution containing W-Co ion and the yield of precipitate of W-Co ion.

Complex ions which are considered as $NH_3$, $OH_2$ have been coordinated to $W^{6+}$ and $NH_3$. When the aqueous solution of nitric acid or hydrochloric acid is added to said complex ion-containing aqueous solution, a white precipitate is deposited. The chemical composition, crystal structure, particle shape and size of said white precipitate and the production quantity of said precipitate are determined by the following reaction conditions.

(1) Quantity of the aqueous solution of nitric acid or hydrochloric acid to be added to $NH_3$.
(2) Reaction temperature.
(3) Concentration of $W^{6+}$.

Among the above-mentioned conditions, the most important reaction element is the condition of the item (1).

For operating quantitatively the condition of the item (1), it is important to know the concentration degree of the free $NH_3$ which has been included in the basic starting solution containing $W^{6+}$ and $NH_3$.

Figure 1:
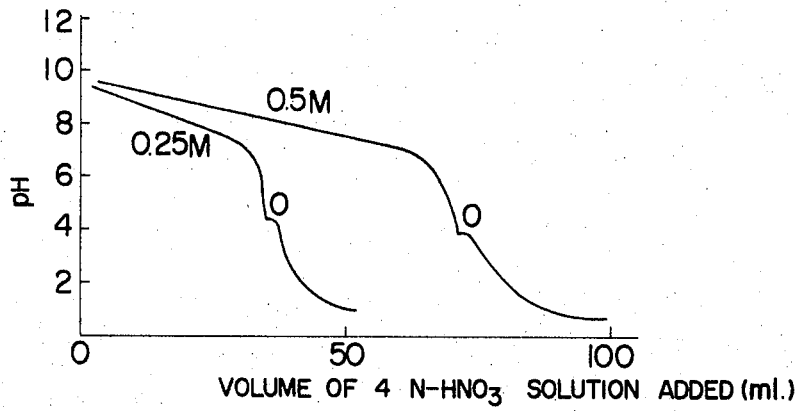
FIG. 1 is a graph illustrating the relationship between the pH value and the quantity of a solution of nitric acid $HNO_3$ added to a solution containing $NH_4OH$ and tungsten ions.

More particularly, FIG. 1 shows the relationship between the quantity of nitric acid solution added and the pH value when a 4 N solution of nitric acid is added respectively to 200 ml. of a solution containing 0.1 mol of tungsten ions and 0.28 mol of free ammonium ions and to 200 ml. of a solution containing 0.05 mol of tungsten ions and 0.14 mol of free ammonium ions. As can be observed from FIG. 1, the pH value gradually decreases with the quantity of acid added, and, at about pH 8 at which tungsten begins to precipitate, the pH value begins to decrease suddenly to exhibit points "0" of discontinuity. As the acidic solution is added further, the pH value decreases further.

Said points "0" are considered to be the points at which the free $NH_3$ existing in the aqueous solution was neutralized.

It is confirmed from the titration curve that in the aqueous solution containing $W^{6+}$ of 0.5 M was included the free $NH_3$ of 1.4 M, and that in the aqueous solution containing $W^{6+}$ of 0.25 M was included the free $NH_3$ of 0.7 M.

The pH value at the point "0" causes the granular growth with the lapse of time and varies in accordance with the quantity of $NH_3$ or $NH_4+$ eluted from the precipitate particle. However, in the present invention, an absolute value of said quantity is not necessitated, but an acid radical quantity to be required in the point "0" is of importance. That is, the present invention has primarily succeeded in obtaining the objective product with good repetition by adopting said acid radical quantity as a base or standard.

It was found that a slight change in the quantity of the acidic solution added near these points "0" results in a variation in the chemical composition of the precipitate and the percentage of precipitation. For example, various samples were prepared by adding varying amounts of 4 N solution of nitric acid into an alkaline solution containing tungsten ions, for example, 200 ml. of a solution containing 0.1 mol of $(NH_4)_2WO_4$ and 0.28 mol of $NH_4OH$, and these samples were caused to react for 20 hours at 70° C., 50° C. and 25° C., respectively.

Figure 2:
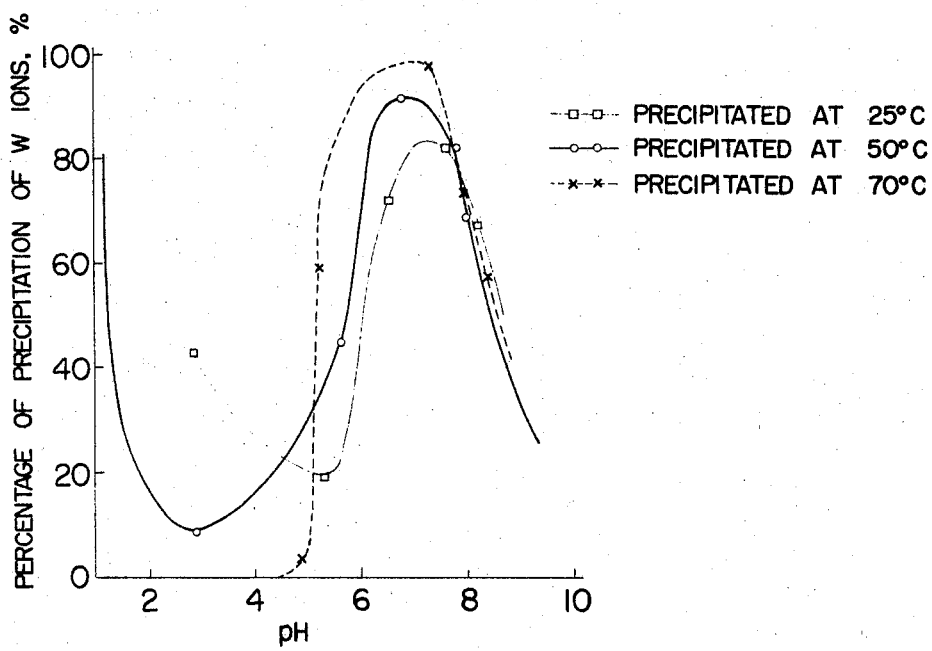
FIG. 2 is a graph illustrating the relationship between the pH value of a solution prepared by adding a solution of nitric acid $HNO_3$ to a solution containing tungsten ions and $NH_4OH$ and causing reaction therebetween for 20 hours and the percentage of precipitation of tungsten ions.

FIG. 2 shows the pH value and the percentage of precipitation of tungsten ions

[(number of tungsten ions in the precipitate/number of tungsten ions in the mother solution) $\times 100$]

from the solution after reaction. Thus, tungsten ions precipitate at high percentages in a range of from about pH 8.2 to pH 5.0.

The results of having studied the products shown in FIG. 2 by chemical analysis, i.e. infrared ray absorption spectrum, and X-ray analysis, are indicated by the following:

| Reaction Conditions | | Products | |
|---|---|---|---|
| pH | Temperature | Chemical Composition | Crystal system |
| 4.5–8.2 | 25° C., 50° C. | $(WO_3)_{12}(NH_3)_{10}(OH_2)_{18}$ | Orthorhombic. |
| 4.5–8.2 | 70° C. | $(WO_3)_{12}(NH_3)_{10}(OH_2)_{10}$ | Monoclinic. |
| 2 | 25° C., 50° C., 70° C. | $WO_4\cdot nH_2O$ | Hexagonal. |

Figure 3:
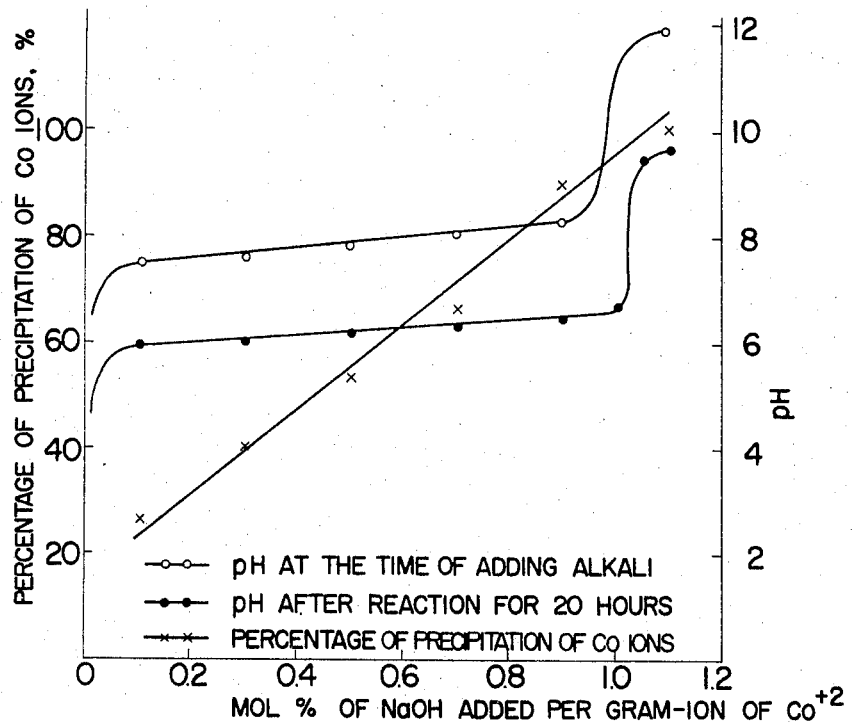
FIG. 3 is a graph to indicate variations in pH value and percentage of preciptation of cobalt ions when an alkali was added to a solution of $Co(NO_3)_2$.

On one hand, FIG. 3 shows the variations in the pH value and the percentage of precipitation when an alkali was added to an acidic solution containing cobalt ions, for example, a solution of cobalt nitrate. As can be observed from FIG. 3, when $Co(OH)_2$ is formed by the addition of the alkali, the pH value increases to about 7, and, at ratios of alkali added of less than 2, the pH value is not varied materially by the addition of the alkali. When solutions containing $Co(OH)_2$ of varying ratios of alkali added are heated at 70° C. for 20 hours, the pH value of the mother solution decreases slightly owing to the growth of grains of $Co(OH)_2$. The percentage of precipitation of cobalt ions increases substantially proportionally to the quantity of alkali added as shown in FIG. 3. When NaOH is added to an acidic solution containing cobalt ions of pH value less than 3, for example, a mixed solution of $HNO_3$ and $Co(NO_3)_2$, $Co(OH)_2$ is formed by precipitation due to the neutralization reaction of cobalt ions after the neutralizing reaction (at a pH value less than 3) of the free nitric acid, as shown in FIG. 4.

Figure 4:
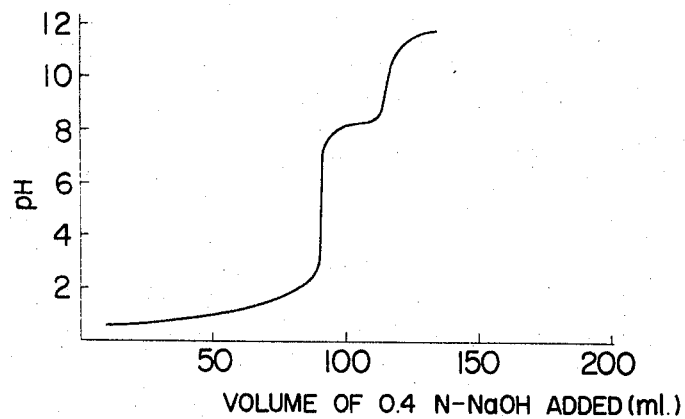
FIG. 4 is a graph to illustrate the relationship between pH value and the quantity of alkali added to a mixed solution of $HNO_3$ and $Co(NO_3)_2$.

In the case of FIGS. 3 and 4 as mentioned above, NaOH was used as alkali, but it was merely used as a convenient means for illustration. In the present invention, however, only $NH_3$ is used as alkali in order to avoid mixing of the alkali metal.

On the basis of the above described phenomena, the reaction conditions between an acidic solution containing cobalt ions and an alkaline solution containing tungsten ions required for effecting precipitation of composite precipitate of tungsten and cobalt were investigated, and it was found that the chemical compositions of the precipitates, particle sizes, and yields of the precipitate vary, depending upon the reaction conditions. For example, 200 ml. of a solution containing 0.28 mol of $NH_4OH$ per 0.1 mol of tungsten ions was mixed with an acidic solution prepared by mixing 200 ml. of 0.2 $M$-$Co(NO_3)_2$ and varying amounts of $HNO_3$, and the volume of the mixture was increased to 500 ml. by adding water. Then the mixture was caused to react at a temperature of 25° C. for 20 hours. Thereafter the weight percentages of cobalt and tungsten contained in the reaction products and the percentage of precipitation of tungsten were measured. The results of measurement are shown in the following Table 1.

TABLE 1

| | | | | | |
|---|---|---|---|---|---|
| pH value of the mother solution after reaction | 6.3 | 5.6 | 5.1 | 4.3 | 2.7 |
| Weight percent of Co in precipitate | 6.6 | 6.3 | 5.1 | 4.8 | 6.2 |
| Weight percent of W in precipitate | 56.5 | 58.0 | 59.8 | 62.8 | 65.5 |
| Weight percent of Co to (Co+W) in the precipitate  | 10.5 | 9.7 | 7.9 | 7.1 | 3.3 |
| Percentage of precipitation of W | 100 | 100 | 74 | 63 | 20 |

$\left(\frac{Co}{Co+W}\times 100\right)$

We have also investigated precipitates formed by the chemical reaction between a basic solution containing tungsten ions and an acidic solution containing cobalt ions and have found that the percentage of precipitation of tungsten ions was higher than that in the chemical reaction involving only tungsten ions. We have therefore concluded that the precipitate is not a mere mixture of tungsten and cobalt but seems to be a compound containing tungsten and cobalt since their grain growths are different. (For convenience, such a precipitate is hereinafter referred to as a composition precipitate of tungsten and cobalt.)

For example, the complex salt particle containing Co ions and W ions deposited at a temperature of 70° C. is the same as the crystal system of $$(WO_3)_{12}(NH_3)_{10}(OH_2)_{10}$$

according to the X-ray analysis, and also the quantity of $NH_3$ contained in said complex salt particle was 0.4 to 0.6 per atom of W ions. This fact shows that in case of comparison with said complex salt which does not contain Co ions, even though the pH value is same, the quantity of $NH_3$ is reduced.

Even by the chemical reaction between a solution of a pH value higher than 8 containing the ions of the iron group and a hydroxide of these ions and an acidic solution (pH 2–4) containing tungsten ions, a composite precipitate of tungsten and a metal of the iron group can be formed readily as long as the pH value is maintained from 4.5 to 8.0 after reaction.

For the reason stated above, it is also possible to produce a composite precipitate of tungsten and cobalt by adding a powder of a solid complex salt, such as ammonium para-tungstate, to a solution of cobalt salt and then causing them to react. The mechanism of this chemical reaction is analogous to that between solutions since the solid state powder is disolved in the liquid, and the precipitate is formed in the solution as the result of chemical reaction. In this process, the reaction velocity between the solid state powder of the complex salt of tungsten and the solution of cobalt salt is mainly determined by the velocity of dissolution of the solid state powder of the complex salt of tungsten in addition to such other factors as the reaction temperature, the state of the cobalt solution, the effective surface area of the solid state powder in the solution, and the like. Precipitates formed in this stage have particle shapes which are quite different from those of the solid particles utilized as the starting material, and the manner of growth of the particle is different, dependent upon the reaction velocity. Further, as the concentration of the cobalt salt is increased, it becomes very difficult to obtain a composite precipitate of tungsten and cobalt containing a larger quantity of cobalt due to proportional increase in the concentration of acid radicals, and a decrase in the pH value after reaction results in precipitates of different chemical compositions and decreased yields. Consequently, it is necessary to add a suitable amount (less than equivalent amount) of alkaline solution to the solution of cobalt salt before reaction takes place in order to form the precipitate by maintaining the pH value of the mother solution in a range of from 4.5 to 8.0.

Alternatively, a powder of water soluble crystals of a metal salt of the iron group is caused to react with a solution containing tungsten ions. For example, powder of $Co(NO_3)_2 \cdot 6H_2O$ and the like is added to an aqueous solution containing tungsten ions to effect said reaction. More particularly, similar composite precipitates of tungsten and cobalt can be formed by adjusting the pH value to 4.5 to 8.0 at the time of forming the precipitates by adding a suitable amount of water or an aqueous solution of an acid or alkali.

When a mixture of crystals of a metal salt of the iron group containing water of crystallization such as $Co(NO_3)_2 \cdot 6H_2O$ and the like and a powder of a complex salt of tungsten is subjected to grinding operation $Co(NO_3)_2 \cdot 6H_2O$ is converted into slurry form by the heat generated by the grinding operation to dissolve therein the complex salt of tungsten, whereby a chemical reaction similar to that described above is caused to form the composite precipitate of tungsten and cobalt. In this reaction, it is advantageous to add a small quantity of water to facilitate precipitation. The pH value of this reaction is determined by the acid radicals of the raw material cobalt salt and the alkali contained in the complex salt, so that, in order to form the precipitate at a suitable pH value in a range of from 4.5 to 8.0, it is necessary to suitably select the quantities of the powder of cobalt salt and of the powder of complex salt of tungsten and to add a suitable quantity of water or an aqueous solution of acid or alkali.

While the above description is directed to the reaction of tungsten ions and cobalt ions in a solution, it is also possible to substitute nickel ions and/or iron ions for a portion or all of cobalt ions to produce composite precipitate of tungsten and a metal or metals of the iron group. It was found that the pH value and the percentage of precipitation of a reaction wherein an alkali is added into a solution containing nickel ions and iron ions are identical to those of the reaction in which cobalt ions are utilized.

While either a solution or solid state powder may be used as the starting material for the iron group (i.e., Fe, Co and Ni) and tungsten, it is possible in each case to form desired composite precipitates of tungsten and a metal or metals of the iron group by suitably selecting the quantity of the starting material, and the quantities of water, acid and alkali which are to be added so that the pH value of the mother solution at the time of forming precipitates is maintained in a range of from 4.5 to 8.0.

The invention will be illustrated in detail in the following examples, which are to be understood as being merely illustrations of certain methods of carrying out the principle of the invention, which is in no sense limited to the exact details therein set forth.

Example 1

260 ml. of a solution containing 0.1 mol of cobalt nitrate $Co(NO_3)_2$ and 0.24 mol of nitric acid $HNO_3$ were added to 200 ml. of a solution containing 0.1 mol of $(NH_4)_2WO_4$ and 0.28 mol of $NH_4OH$ to produce a pale red mother solution of pH 5.3, from which was deposited a precipitate of pale purple red color. When this reaction system was reacted uniformly for 20 hours at 70° C. with stirring, the pH value of the mother solution was slightly increased to 5.4, while at the same time a violet composite precipitate of tungsten and cobalt was formed. The product was filtered and dried to obtain 32.3 g. of a powder containing 8.61% of cobalt and 51.71% of tungsten, by weight.

Example 2

20 g. (corresponding to 0.076 mol of tungsten) of ammonium paratungstate powder was added to 29 ml. of 0.5 M-Co(NO$_3$)$_2$, and the mixture was diluted with water until a total volume of 300 ml. was obtained. The red solution of pH 4.6 was then heated to 70° C. and stirred to cause uniform dispersion and movement of the particles of ammonium paratungstate throughout the solution. The reaction was continued in this state for 8 hours to increase the pH value to 5.5 by the dissolving and precipitation reactions concurrently with the precipitation of pink composite precipitate of tungsten and cobalt. This precipitate was then filtered and dried to obtain a powder of 21 g. containing 3.49% of cobalt and 66.3% of tungsten by weight.

Example 3

20 g. of ammonium paratungstate powder identical to that utilized in Example 2 was added to 94.0 ml. of a mixed solution consisting of 0.038 mol of Co(NO$_3$)$_2$ and 0.038 mol of NH$_4$OH and the resultant mixture was diluted with water until a total volume of 300 ml. was obtained. The solution of pH 7.47 thus obtained was reacted while it was stirred at 60° C. for 12 hours. The precipitate formed in the mother solution of pH 6.35 was filtered and dried, whereby 23 g. of a purple powder consisting of a composite precipitate containing 7.35% of cobalt and 62.48% of tungsten, by weight, was obtained.

Example 4

260 ml. of a solution containing 0.04 mol of nickel chloride NiCl$_2$ and 0.24 mol of hydrochloric acid HCl were added to 200 ml. of a solution containing 0.28 mol of NH$_4$OH and 0.1 mol of (NH$_4$)$_2$WO$_4$ to produce a pale green mother solution of pH 6.2 and a pale green white precipitate. The reaction system was heated to 70° C. and stirred for effecting uniform reaction for 20 hours. The pH value of the mother solution was slightly increased to 6.4 concurrently with the formation of the green white composite precipitate of tungsten and nickel. The precipitate was then filtered and dried to obtain 32.4 g. of a powder containing 7.21% of nickel and 54.3% of tungsten, by weight.

Example 5

130 ml. of a solution containing 0.02 mol of ferrous chloride FeCl$_2$ and 0.12 mol of hydrochloric acid HCl were added to 100 ml. of a solution containing 0.14 mol of NH$_4$OH and 0.05 mol of (NH$_4$)$_2$WO$_4$ in an atmosphere of nitrogen to form a mother solution of pH 6.7 and a gray white precipitate. The mother solution was then heated to 70° C. and stirred for 10 hours in the atmosphere of nitrogen, whereby the pH value was slightly increased to 6.9, and a gray white precipitate comprising tungsten ions and iron ions was formed. The precipitate was filtered and dried to obtain 16.9 g. of a gray brown powder containing 6.9% of iron and 55.14% of tungsten, by weight.

Example 6

130 ml. of a solution containing 0.025 mol of cobalt nitrate Co(NO$_3$)$_2$, 0.025 mol of nickel nitrate Ni(NO$_3$)$_2$, and 0.12 mol of nitric acid HNO$_3$ were added to 100 ml. of a solution containing 0.14 mol of NH$_4$OH and 0.05 mol of (NH$_4$)$_2$WO$_4$ to produce a pink mother solution of pH 6.4 and a pale white pink precipitate. The reaction system was heated to 70° C. and stirred for 20 hours to effect uniform reaction. The pH value of the mother solution was slightly increased to 6.6, and a composite precipitate of tungsten, cobalt and nickel was formed. The product was then filtered and dried to obtain 16.1 g. of a powder containing 4.30% of cobalt, 3.68% of nickel and 54.73% of tungsten, by weight.

Each of the precipitates, for example, composite precipitate of tungsten and cobalt produced as above described according to the method of this invention undergoes dehydration when heated to a temperature above 400° C. to be converted into a fine composite oxide of tungsten and cobalt. When heating is carried out in hydrogen, reduction of the oxide begins at a temperature above 450° C., and the reduction is completed at a temperature of more than 700° C. to produce a composite metal powder of tungsten and cobalt.

When a suitable quantity of carbon black serving as a carburizing agent is added to any one of said composite precipitate of tungsten and cobalt, composite oxide of tungsten and cobalt and composite metal powder of tungsten and cobalt, and the material is heated in a non-oxidizing atmosphere, such as hydrogen or in a vacuum, a composite powder of tungsten carbide WC and cobalt can be obtained.

With regard to various methods of mixing the carburizing agent, the method wherein the carburizing agent is mixed with the composite precipitate is advantageous in that it does not require a ball mill process, which is necessary for conventional methods, and in that uniform mixing can be provided by agitation alone, but when compared with the methods to be described later, this method requires a larger quantity of carbon to be mixed. On the other hand, when the carburizing agent is mixed with the composite oxide, it is possible to readily control the quantity of carbon in the carburized product. In the case wherein the carburizing agent is mixed with the composite metal powder after reduction, control of the quantity of carbon in the carburized product is the easiest, but this method is troublesome in that it requires a separate reducing step. As the carburizing agent, in addition to carbon black mentioned above, sugar carbon, graphite or any other suitable carburizing agent may be used.

The quantity of carbon to be added should be selected to satisfy the quantity required for producing the desired tungsten carbide WC and for reducing the oxides. As the quantity of carbon required for reduction is determined by the process of mixing carbon, the atmosphere used for effecting carburization, temperature and the like, it is necessary to carefully adjust the quantity added to the required quantity for each case.

For example, where a composite oxide of tungsten and cobalt obtained by dehydration is to be carburized by heating in hydrogen, the oxide is reduced by carbon as well as hydrogen. However, as the temperature is increased, the proportion of the oxide which is reduced by carbon increases, so that the quantity of carbon required for reduction should be increased with temperature. On the other hand, when the oxide is treated in a vacuum, the oxide is reduced by carbon alone, so that it is necessary to add carbon of the quantity necessary for reducing all of the oxide. Further, where carbon is mixed with the composite precipitate and the mixture is then caused to undergo dehydration, it is necessary to use an additional quantity of carbon which will compensate for the carbon lost by dehydration in addition to said quantity of carbon.

Examples of carburizing composite precipitates of tungsten and a metal or metals of the iron group are presented herebelow.

Example 7

13.1 g. of carbon black was added to 100 g. of a composite oxide of tungsten and cobalt consisting of 76.4% of tungsten, 3.9% of cobalt and a balance of oxygen and prepared by heating a composite precipitate of tungsten and cobalt at 500° C. for 3 hours, and the mixture was then carburized at 1100° C. for 3 hours in hydrogen to obtain approximately 85 g. of a composite powder of tungsten carbide WC and cobalt containing 6.18% of carbon in the form of tungsten carbide. It was found that 14.2 g. of carbon black is required for carburizing the mixture at 1200° C. to produce a composite powder of tungsten carbide WC and cobalt.

Example 8

19.8 g. of carbon black was mixed with 100 g. of the same composite oxide as that of Example 7 and carburized at 1100° C. for 3 hours in a vacuum to obtain 85 g. of composite powder of tungsten carbide WC and cobalt containing 6.25% of carbon in the form of tungsten carbide.

Example 9

We have found that when carbon black is mixed with a composite precipitate, about 5% of carbon black is lost during dehydration, and that a composite powder of tungsten carbide WC and cobalt containing the desired quantity of carbon can be obtained by adding carbon of a quantity which is increased by said lost quantity. Thus, in this example, 13.8 g. of carbon black was added to a precipitate corresponding to 100 g. of the same oxide as that of Example 7, and the mixture was heated at 500° C. for three hours to obtain a mixed powder containing 13.2 g. of carbon black per 100 g. of oxide. The mixed powder was carburized by heating it at 1100° C. for 3 hours in hydrogen to obtain approximately 82 g. of a composite powder of tungsten carbide WC and cobalt containing 6.30% of carbon in the form of tungsten carbide.

Example 10

When a reduced composite metal powder is to be carburized, it is necessary to add carbon of the quantity required for producing tungsten carbide WC. Thus, 5.8 g. of carbon black was added to 100 g. of a composite metal powder of tungsten and cobalt which was prepared by reducing a composite precipitate of tungsten and cobalt by heating it at 800° C. for 2 hours in hydrogen and containing 87.7% of tungsten and 12.3% of cobalt, and the mixture was carburized by heating it at 1100° C. for 1.5 hours in a vacuum to obtain about 105 g. of a composite powder of tungsten carbide WC and cobalt containing 6.17% of carbon in the form of tungsten carbide.

Example 11

Instead of utilizing solid carburizing agents, it is also possible to produce the desired composite powder of tungsten carbide WC and cobalt by a gas-phase carburization process wherein the composite oxide is heated in a carburizing atmosphere such as carbon monoxide, methane and the like whose concentration has been suitably adjusted. Thus, for example, a composite oxide of tungsten and cobalt was heated at various temperatures for 2 hours in a mixed gas flow consisting of 250 ml./min. of hydrogen and 50 ml./min. of methane, whereby a composite powder of tungsten carbide WC and cobalt was obtained at temperatures exceeding 1050° C. When heating was carried out at 1050° C., the quantity of carbon in the powder in the form of tungsten carbide was found to be 6.30%, and the quantity of carbon, when heating was carried out at 1100° C., was substantially the same amount.

Example 12

13.0 g. of carbon black was added to 100 g. of a composite oxide of tungsten and nickel which was prepared by heating a composite precipitate of tungsten and nickel at 500° C. for 3 hours and contained 11.62% of nickel, 67.48% of tungsten, and a balance of oxygen, and the mixture was carburized at 1100° C. for 3 hours in hydrogen to obtain approximately 83 g. of a composite powder of tungsten carbide WC and nickel containing 6.31% of carbon in the form of tungsten carbide.

Example 13

12.8 g. of carbon black was added to 100 g. of a composite oxide of tungsten and iron which was prepared by heating a composite precipitate of tungsten and iron at 500° C. for 3 hours and contained 16.28% of iron, 62.20% of tungsten, and balance of oxygen, and then the mixture was carburized at 1100° C. for 3 hours in hydrogen to obtain about 82 g. of a composite powder of tungsten carbide WC and iron containing 6.10% of carbon in the form of tungsten carbide.

Example 14

12.5 g. of carbon black was added to 100 g. of a composite oxide of tungsten, cobalt and nickel which was prepared by substituting a portion of cobalt of a composite precipitate of tungsten and cobalt by nickel and heating the composite precipitate of tungsten, cobalt and nickel at 500° C. for 3 hours, and which contained 8.64% of cobalt, 7.97% of nickel, 63.13% of tungsten, and a balance of oxygen, and then the mixture was carburized by heating it at 1100° C. for 3 hours in hydrogen to obtain approximately 84 g. of a composite powder of tungsten carbide WC, cobalt, and nickel containing 6.09% of carbon in the form of tungsten carbide.

As can be clearly observed from the foregoing examples, it is possible to adjust the quantity of carbon after carburization to an exact value by adding a suitable quantity of the carburizing agent in each case. The following Table 2 represents products resulting from carburization in hydrogen at various temperatures. As is apparent from Table 2, since it is impossible to produce desired products, or tungsten carbide WC, at low temperatures, it is essential to carry out carburization at temperatures above 1100° C. in order to produce composite powders of tungsten carbide WC and cobalt.

TABLE 2

[Carburization period: 3 hours]

| Carburization temp. ° C.: | Products (determined by X-ray diffraction) |
|---|---|
| 700 | W, Co. |
| 800 | $Co_2W_4C$, W, Co. |
| 900 | WC, $W_2C$, $Co_3W_3C$, Co. |
| 1000 | WC, $W_2C$, $Co_3W_3C$, Co |
| 1100 | WC, Co. |
| 1200 | WC, Co. |
| 1300 | WC, Co. |
| 1400 | WC, Co. |

However, carburization at temperatures above 1200° C. is not desirable because at such high temperatures, the powder formed begins to sinter and hence aggregates. Thus, temperatures of approximately 1100° C. are optimum. Also, when the carburizing reaction is effected in a vacuum, temperatures of about 1100° C. produce the most satisfactory products.

Present methods of preparing tungsten carbide WC require high temperatures in a range of from 1400 to 1500° C. when tungsten metal and carbon powder are heated to effect carburizing reaction in hydrogen or a vacuum, whereas this invention is characterized by carburization reaction at much lower temperatures. This feature is afforded by the use of a composite precipitate of tungsten and a metal of the iron group prepared by chemical process. The composite powder of tungsten carbide WC and a metal of the iron group can be press-moulded and sintered into sintered alloys by the same process as that utilized for the conventional mixed powder of tungsten carbide and a metal of the iron group. One example of making sintered alloys from the composite powder of this invention is as follows:

As the starting material, a composite powder of tungsten carbide WC and cobalt consisting of 13.6% of cobalt, 5.35% of total carbon, 0.08% of free carbon, and a balance of tungsten was utilized, and the composite powder was moulded under a pressure of 1 t./cm.² and then sintered in hydrogen. The following Table 3 indicates the relationship between sintering conditions and physical properties of sintered alloys.

TABLE 3

| Sintering conditions | | Shrinkage percent | Density g./cm.³ | Rockwell hardness RA | Transverse-rupture strength kg./mm.² |
| --- | --- | --- | --- | --- | --- |
| Temp. °C. | Time (min.) | | | | |
| 1,300 | 30 | 20.2 | 12.00 | 78.8 | 104.2 |
| 1,325 | 30 | 23.7 | 13.91 | 89.7 | 175.0 |
| 1,350 | 30 | 23.0 | 14.00 | 89.4 | 197.8 |
| 1,400 | 30 | 23.0 | 14.03 | 88.8 | 196.3 |
| 1,450 | 30 | 23.0 | 13.94 | 87.9 | 205.0 |
| 1,250 | 60 | 19.1 | 11.80 | 76.3 | 99.0 |
| 1,325 | 60 | 23.7 | 13.94 | 88.6 | 220.0 |
| 1,350 | 60 | 23.0 | 14.00 | 89.3 | 186.5 |
| 1,400 | 60 | 23.0 | 13.91 | 88.8 | 189.5 |

As is apparent from Table 3, sintered alloys which have been sintered at temperatures above 1325° C. exhibit amply high density and mechanical properties which are comparable to those of conventional sintered alloys of WC-Co series. While prior art methods require higher sintering temperature, this invention requires relatively low sintering temperature of 1325°, which is attributable to the use of a composite powder of tungsten carbide WC and cobalt prepared in accordance with this invention.

It is also possible to add a desired quantity of one or more carbides of transition metals belonging to groups 4, 5, and 6 of the periodic table such as TiC, TaC, VC and the like to the composite powder of tungsten carbide WC and a metal or metals of the iron group and then to mould and sinter the mixture by a method similar to the conventional method of making sintered alloys of multi-carbide series thereby producing sintered alloys of multi-carbide series such as WC-TiC-Co, WC-TaC-Co, WC-TiC-TaC-VC-Co, etc.

More specifically, a mixed powder prepared by adding titanium carbide TiC powder to the composite powder of tungsten carbide WC and cobalt and containing 5.0% of cobalt, 9.7% of titanium, 7.47% of total carbon, 0.12% of free carbon, and a balance of tungsten was moulded under a pressure of 1 t./cm.² and sintered in a vacuum at a temperature of 1500° C. for 45 minutes to obtain a sintered alloy of WC-TiC-Co series having a density of 11.97 g./cm.³, a Rockwell hardness of RA 92.3, and a transverse-rupture strength of 142 kg./mm.². Powders of TiC, TaC and VC were further added to the composite powder of tungsten carbide WC and cobalt to form a mixed powder containing 6.1% of cobalt, 0.8% of titanium, 2.8% of tantalum, 0.4% of vanadium, 6.05% of total carbon, 0.10% of free carbon, and a balance of tungsten. The mixed powder was then moulded under a pressure of 1 t./cm.² and sintered in hydrogen at a temperature of 1400° C. for 20 minutes, whereupon a sintered alloy of WC-TiC-TaC-VC series having a density of 14.35 g./cm.³, a Rockwell hardness of RA 93.1 and a transverse-rupture strength of 136 kg./mm.² was obtained. The properties of these sintered alloys are comparable to those of sintered alloys prepared by conventional methods.

The following examples are presented to illustrate the properties of sintered alloys, a portion of all of the cobalt thereof having been substituted by iron or nickel.

A composite powder of tungsten carbide WC and nickel containing 13.9% of nickel, 5.37% of total carbon, and a balance of tungsten was moulded under a pressure of 1 t./cm.², and sintered in hydrogen at a temperature of 1350° C. for 30 minutes, whereupon a sintered alloy of WC-Ni series having a density of 13.94 g./cm.³, a Rockwell hardness of RA 87.0, and a tranverse- rupture strength of 161 kg./mm.² was obtained. Next, a composite powder of tungsten carbide WC and iron containing 19.7% of iron, 5.05% of total carbon, and a balance of tungsten was moulded under a pressure of 1 t./cm.² and then sintered in hydrogen at 1350° C. for 30 minutes.

As a consequence, a sintered alloy of WC-Fe series having a density of 12.91 g./cm.³, a Rockwell hardness of RA 86.1, and a transverse-rupture strength of 165 kg./mm.² was obtained. A composite powder of tungsten carbide WC, cobalt and nickel containing 10.3% of cobalt, 9.5% of nickel, 4.99% of total carbon, and a balance of tungsten was moulded under a pressure of 1 t./ cm.² and then sintered in hydrogen at 1350° C. for 30 minutes, whereupon a sintered alloy of WC-Co-Ni series having a density of 13.52 g./cm.³, a Rockwell hardness of RA 84.8 and a transverse-rupture strength of 178 kg./mm.² was obtained.

The above described composite powders of tungsten carbide WC and a metal or metals of the iron group are useful not only as raw materials for sintered alloys but also as hard facing agents or materials which are sintered onto the surfaces of metal substrates to form hard layers. For such applications, more suitable hard facing agents can be prepared by forming composite powders containing carbides of tungsten such as WC, $W_2C$ and the like and composite carbides of W-Co-C series such as $W_3Co_3C$, $W_4Co_2C$ and the like by causing carburization at temperature between 800° C. and 1000° C. as shown in Table 2 in the process of manufacturing the composite powder of tungsten carbide WC and cobalt. These phases are very fine and evenly distributed so that, when heated in a non-oxidizing atmosphere, they react readily to form a liquid phase capable of adhereing to the surface of the metal substrate at temperature below the melting points of iron and steel, for example, 1100–1300° C. Further, owing to the remaining solid phase, the reaction mixture has a suitable viscosity over a wide temperature range, whereby there is no tendency thereof of flowing off the surface of the metal substrate.

When a mixture of tungsten carbide and a metal of the iron group which is prepared by mechanically mixing the ingredients as in the case of a conventional sintered alloy is used, it is very difficult to form a liquid phase of a quantity sufficient to provide desired bonding at a temperature below the melting points of steel and iron, and such a liquid phase can be readily formed only when a composite powder of this invention is used wherein various phase are uniformly distributed in the form of very fine particles. One example of the tungsten, cobalt and carbon series will be described hereinbelow.

A composite powder comprising various phases of WC, $W_2C$, $W_3Co_3C$, $W_4Co_2C$, Co and C and having the chemical composition of 10% of Co, 5.6% of C, and a balance of tungsten was spread over a surface of a steel substrate as a thin layer, heated for a short time at a temperature between 1200 and 1280° C. in a non-oxidizing atmosphere, and then cooled, whereupon a hard layer of uniform thickness of 0.2 to 0.3 mm. which was firmly bonded onto the surface of the steel substrate was formed. This layer comprises fine particles of carbide and a metallic binder phase essentially consisting of cobalt, the hardness of the carbide being 1500 to 2000 micro-Vickers, and that of the binder phase being 700 to 1000 micro-Vickers. Even when the steel substrate provided with the hard layer was water quenched from 800 to 900° C., the bond between the steel substrate and the hard layer was not impaired, yet the hardness of the metallic binder phase was increased from 1000 to 1300 micro-Vickers. As a result of abrasion resistant test utilizing a cemented tungsten carbide, it was found that the abrasion resistance of the hardened layer was about 30 times higher than that of heat-treated carbon tool steel.

It is also possible to use composite powders in which a portion or all of the cobalt has been replaced by nickel and/or iron as the hard facing agent. Mixtures of the composite powder and various carbides and oxides having relatively coarse grain size such as, for example, 10 to 100 meshes are also suitable as hard facing agents.

Further, sintered alloys of W-Co, W-Ni and W-Fe series which are prepared by moulding under pressure and then sintering in a non-oxidizing atmosphere composite powders of tungsten and a metal of iron group such as reduced W-Co, W-Ni, W-Fe, etc., are suitable for use as heavy metals, electric contacts, electrodes for electro-discharge machining and the like. For example, when a composite powder consisting of 90.5% of tungsten and 9.5% of cobalt was moulded under a pressure of 3 t./cm.$^2$ and then sintered in hydrogen at a temperature between 1400° C. and 1510° C. for one hour, sintered alloys having densities of 12.0 g./cm.$^3$ and 16.9 g./cm.$^3$, respectively, were produced. Densities of sintered alloys prepared by processing under the same conditions a composite powder consisting 90% of tungsten and 10% of nickel were 11.5 g./cm.$^3$ and 16.5 g./cm.$^3$, respectively.

While this invention has been described in connection with some preferred embodiments thereof, this invention is not limited thereto and is intended to include any modifications and alterations as fall within the true spirit and scope of the invention as defined in the appended claims.

What we claim is:

1. A method for preparing raw materials for sintered alloys comprising mixing a basic aqueous solution of ammonium paratungstate and an acid aqueous solution of at least one metal selected from an iron group consisting of cobalt, nickel and iron, said acid selected from a group consisting of nitric and hydrochloric, subjecting said mixed solutions to a neutralizing reaction at a temperature of 20 to 80° C.; adjusting the pH value of the mother solution after reaction thereof to 4.5 to 8.0; separating the so produced precipitate from the mother solution by filtering followed by drying by heating to produce a fine composite precipitate containing tungsten and at least one metal of said iron group and having completely uniform quality; and subjecting said composite precipitate to carburization by heating under conditions causing production of tungsten carbide, thereby obtaining a composite powder of tungsten carbide and at least one metal of said iron group, said composite powder being suitable as raw materials for sintered alloys.

2. A method for preparing raw materials for sintered alloys according to claim 1, in which the carburization of the composite precipitate is carried out by mixing it with a carburizing agent in a non-oxidizing atmosphere at a temperature of about 1100° C.

3. A method for preparing raw materials for sintered alloys according to claim 1, in which the carburization of the composite precipitate is carried out in a reducing atmosphere at a temperature between 400° C. and 1100° C.

4. A method for preparing raw materials for sintered alloys according to claim 1, in which the carburization of the composite precipitate is carried out at a temperature of about 1100° C. in a carburizing atmosphere consisting of at least one substance selected from the group consisting of CO and $CH_4$.

5. A method for preparing raw materials for sintered alloys according to claim 1, in which the carburization of the composite precipitate is carried out by mixing it with a carburizing agent in a non-oxidizing atmosphere at a temperature of 800 to 1000° C.

6. A method for preparing raw materials for sintered alloys according to claim 2, further comprising mixing the finally produced composite powder consisting of tungsten carbide and at least one metal of said iron group with at least one carbide selected from the group consisting of carbides of transition metals belonging to the fourth, fifth and sixth groups of the periodic table, to prepare a raw material for a sintered alloy.

7. A method for preparing raw materials for sintered alloys comprising mixing a suspension of ammonium paratungstate powder and an acid aqueous solution of at least one metal selected from an iron group consisting of cobalt, nickel and iron, said acid selected from a group consisting of nitric and hydrochloric subjecting said mixed solution to thorough agitation at a temperature from 20 to 80° C. to effect chemical reaction thereof; adjusting the pH value of the mother solution after reaction thereof to 4.5 to 8.0; separating the thus produced precipitate from the mother solution by filtering and drying by heating to produce a fine composite precipitate containing tungsten and at least one metal of said iron group and having the completely uniform quality; and subjecting said composite precipitate to carburization by heating under conditions causing production of tungsten carbide, thereby obtaining a composite powder of tungsten carbide and at least one metal of said iron group, said composite powder being suitable as raw materials for sintered alloys.

8. A method for preparing raw materials for sintered alloys according to claim 7, in which the carburization of the composite precipitate is carried out by mixing it with a carburizing agent and in a non-oxidizing atmosphere at a temperature of about 1100° C.

9. A method for preparing raw materials for sintered alloys according to claim 7, in which the carburization of the composite precipitate is carried out in a reducing atmosphere at a temperature between 400° C. and 1100° C.

10. A method for preparing raw materials for sintered alloys according to claim 7, in which the carburization of the composite precipitate is carried out at a temperature of about 1100° C. in a carburizing atmosphere consisting of at least one substance selected from the group consisting of CO and $CH_4$.

11. A method for preparing raw materials for sintered alloys according to claim 7, in which the carburization of the complete precipitate is carried out by mixing it with a carburizing agent in a non-oxidizing atmosphere at a temperature of 800 to 1000° C.

12. A method for preparing raw materials for sintered alloys according to claim 8, further comprising mixing the finally produced composite powder consisting of tungsten carbide and at least one metal of said iron group with at least one carbide selected from the group consisting of carbides of transition metals belonging to the fourth, fifth and sixth groups of the periodic table.

13. A method for preparing raw materials for sintered alloys comprising mixing a suspension of ammonium paratungstate powder, an acid aqueous solution of at least one metal selected from an iron group consisting of cobalt, nickel and iron, said acid selected from a group consisting of nitric and hydrochloric, and ammonia aqueous solution; subjecting said mixed solutions to thorough agitation to effect chemical reaction thereof; adjusting the pH value of mother solution after reaction to 4.5 to 8.0; separating the thus produced precipitate from the mother solution by filtering and drying by heating to produce a fine composite precipitate containing tungsten and at least one metal from said iron group and having a completely uniform quality; and subjecting said composite precipitate to carburization by heating under conditions causing production of tungsten carbide, thereby obtaining a composite powder of tungsten carbide and at least one metal of said iron group, said composite powder being suitable as raw materials for sintered alloys.

14. A method for preparing raw materials for sintered alloys according to claim 13, in which the carburization of the composite precipitate is carried out by mixing it with a carburizing agent in a non-oxidizing atmosphere at a temperature of about 1100° C.

15. A method for preparing raw materials for sintered alloys according to claim 13, in which the carburization of the composite precipitate is carried out in a reducing atmosphere at a temperature between 400° C. and 1100° C.

16. A method for preparing raw materials for sintered alloys according to claim 13, in which the carburization of the composite precipitate is carried out at a temperature of about 1100° C. in a carburizing atmosphere consisting of at least one substance selected from the group consisting of CO and $CH_4$.

17. A method for preparing raw materials for sintered alloys according to claim 13, in which the carburization of the composite precipitate is carried out by mixing it with a carburizing agent in a non-oxidizing atmosphere at a temperature of 800° C. to 1000° C.

18. A method for preparing raw materials for sintered alloys according to claim 14, further comprising mixing the finally produced composite powder consisting of tungsten carbide and at least one metal of said iron group with at least one carbide selected from the group consisting of carbides of transition metals belonging to the fourth, fifth and sixth groups of the periodic table.

References Cited

UNITED STATES PATENTS 3,013,875  12/1961  Triffleman _____ 75—0.5

L. DEWAYNE RUTLEDGE, *Primary Examiner.*

W. W. STALLARD, *Assistant Examiner.*

U.S. Cl. X.R.

75—108